(12) United States Patent
Ponziani et al.

(10) Patent No.: US 7,093,421 B2
(45) Date of Patent: Aug. 22, 2006

(54) SPARK IGNITER FOR GAS TURBINE ENGINE

(75) Inventors: Robert L. Ponziani, West Chester, OH (US); Roy Earwood, Lebanon, OH (US)

(73) Assignee: General Electric Company, Schenectady, NY (US)

( * ) Notice: Subject to any disclaimer, the term of this patent is extended or adjusted under 35 U.S.C. 154(b) by 53 days.

(21) Appl. No.: 10/775,846

(22) Filed: Feb. 10, 2004

(65) Prior Publication Data

US 2005/0172636 A1 Aug. 11, 2005

(51) Int. Cl.
*H01T 13/00* (2006.01)
*F02C 7/266* (2006.01)

(52) U.S. Cl. .................... 60/39.827; 123/169 E; 123/169 EI; 313/140

(58) Field of Classification Search ............ 60/39.827; 313/125, 128, 140; 123/169 E, 169 EI
See application file for complete search history.

(56) References Cited

U.S. PATENT DOCUMENTS

| | | | |
|---|---|---|---|
| 2,969,500 A * | 1/1961 | Andert | 324/395 |
| 3,967,149 A * | 6/1976 | Eaton et al. | 313/141 |
| 4,284,054 A * | 8/1981 | Kumagai et al. | 123/536 |
| 4,814,664 A * | 3/1989 | Rothenbuhler | 313/131 R |
| 4,914,344 A * | 4/1990 | Watanabe et al. | 313/141 |
| 5,155,437 A | 10/1992 | Frus | |
| 5,194,813 A | 3/1993 | Hannah et al. | |
| 5,343,154 A | 8/1994 | Frus | |
| 5,491,416 A * | 2/1996 | Klimstra et al. | 324/393 |
| 5,508,618 A * | 4/1996 | Owens | 324/402 |
| 5,523,691 A | 6/1996 | Frus | |
| 5,587,630 A * | 12/1996 | Dooley | 315/209 T |
| 5,606,118 A | 2/1997 | Muth et al. | |
| 5,612,586 A | 3/1997 | Benedikt et al. | |
| 5,675,257 A | 10/1997 | Frus | |
| 6,362,562 B1 | 3/2002 | Rossi | |
| 6,380,664 B1 | 4/2002 | Pollner | |
| 6,505,605 B1 | 1/2003 | Yamada | |
| 6,531,809 B1 | 3/2003 | Benedikt et al. | |

* cited by examiner

*Primary Examiner*—Ted Kim
(74) *Attorney, Agent, or Firm*—William Scott Andes; Gregory A. Welte (57) ABSTRACT

An igniter for a gas turbine engine. An igniter generates a plasma, or spark, somewhat similar to an automotive spark plug. In the invention, an auxiliary electrode is provided, which is embedded in and covered by a solid insulator. During initial phases of operation, no part of the plasma generated contacts the auxiliary electrode. However, eventually, the covering insulation is eroded by the plasma, and the auxiliary electrode becomes exposed and available as a return path for the plasma. The igniter is constructed so that, when this erosion occurs, the lifetime of the igniter is near its end. Detection of this erosion, as by detecting the new current in the auxiliary ground electrode, indicates the approaching end-of-lifetime.

21 Claims, 7 Drawing Sheets

SPARK IGNITER FOR GAS TURBINE ENGINE

CROSS REFERENCE TO RELATED APPLICATIONS

This Application is related to subject matter in the following patent applications, which are of common inventorship and filed concurrently herewith:

SENSOR FOR DETECTION OF SPARK IN IGNITER IN GAS TURBINE ENGINE, Ser. No. 10/775,887;

METHOD OF INFORMING PILOT OF AIRCRAFT OF SPARK DETECTED IN GAS TURBINE ENGINE, Ser. No. 10/775,864;

INTEGRAL SPARK DETECTOR IN FITTING WHICH SUPPORTS IGNITER IN GAS TURBINE ENGINE, Ser. No. 10/775, 851;

DETECTING SPARK IN IGNITER OF GAS TURBINE ENGINE BY DETECTING SIGNALS IN GROUNDED RF SHIELDING, Ser. No. 10/775,847; and PASSIVE, HIGH-TEMPERATURE AMPLIFIER FOR AMPLIFYING SPARK SIGNALS DETECTED IN IGNITER IN GAS TURBINE ENGINE, Ser. No. 10/775,876.

FIELD OF THE INVENTION

The invention relates to gas turbine engines, and igniters therein.

BACKGROUND OF THE INVENTION

This Background will explain why the lack of absolute certainty in lifetimes of igniters used in gas turbine aircraft engines can impose significant costs on the owners of the aircraft utilizing the engines.

Figure 1:
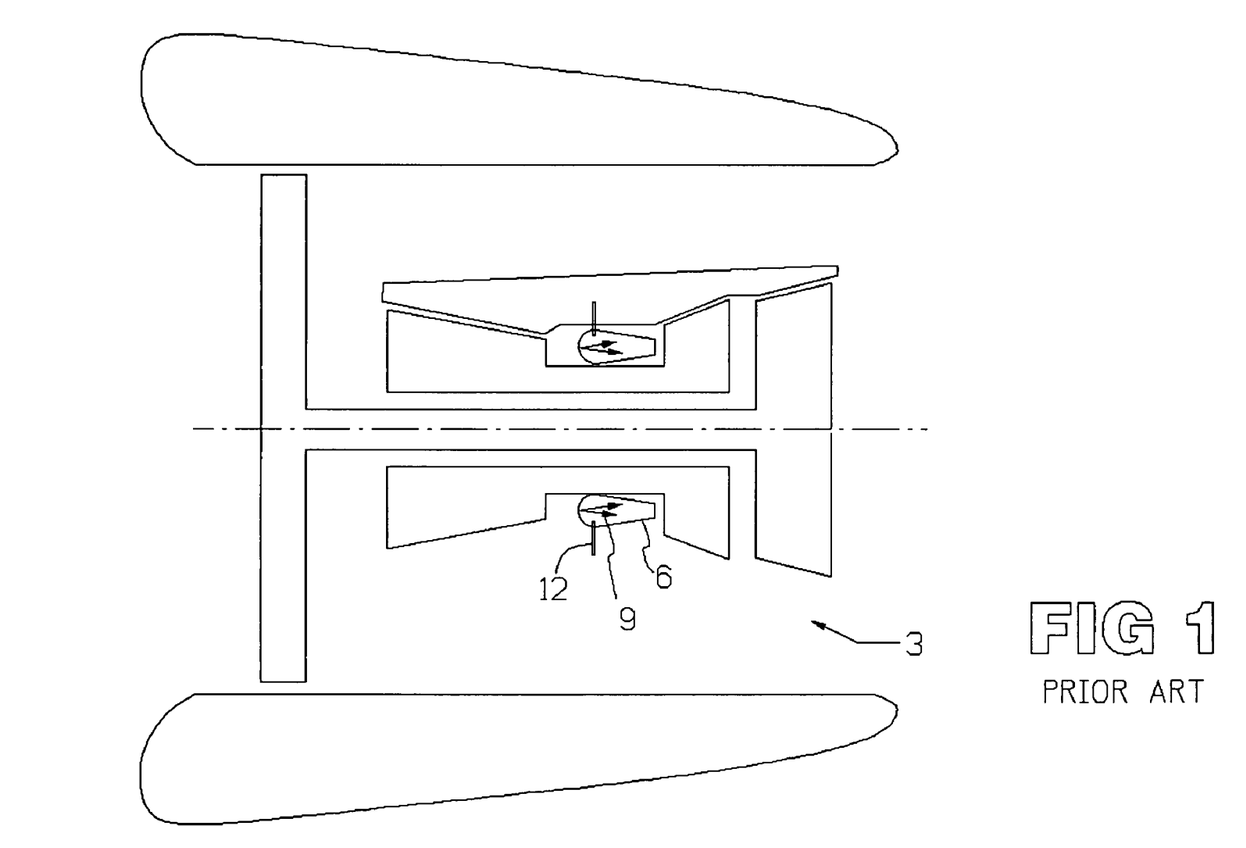
FIG. 1 is a simplified schematic of a gas turbine engine.

FIG. 1 is a highly schematic illustration of a gas turbine engine 3, containing a combustor 6. Fuel 9 is sprayed into the combustor. An igniter 12, which functions in a roughly analogous manner to a spark plug in an automobile, produces a spark, or plasma discharge (not shown), which initially ignites the jet fuel.

After initial ignition, the igniter 12 can be repeatedly sparked thereafter, primarily as a safety measure. That is, in a modern engine, under normal circumstances, it is extremely unlikely for a flame-out to occur in the combustor 6. However, unexpected situations, such as an abrupt crosswind, can affect the environment within the combustor, and resulting loss of flame.

In addition, certain flight conditions make the unlikely event of a flame-out slightly more probable. Thus, for example, the igniter 12 may be activated when the aircraft enters a rain squall, or other situation which may disturb steady-state conditions in the combustor 6.

The igniters 12, like all mechanical components, have useful lives which eventually expire, at which time the igniters must be replaced. However, this expiration-and-replacement can create a situation in aircraft which is expensive.

A primary reason is that the approach of an igniter to the end of its lifetime is not marked by readily detectable events. That is, at some point, the igniter completely ceases to generate a plasma, or spark. However, prior to that point, the igniter may sporadically generate sparks.

As explained above, the sparking is not, in general, required to maintain the combustor flame. Consequently, the sporadic sparking would only be noticed if an actual flame-out occurred, and if the sporadic sparking were ineffective to induce a re-light. Since such a combination of events is seen as unlikely, the sporadic sparking is not readily noticed. The impending expiration of the useful life of the igniter is similarly not noticed.

Another reason is that, while all igniters may be constructed as identically as possible, nevertheless, those igniters do not all possess the same lifetimes. Nor do all igniters experience identical events during their lifetimes. Thus, it is not known exactly when a given igniter will expire.

Thus, the point in time when an igniter must be replaced is not known with certainty. One approach to solving this problem is to perform preventative maintenance, by replacing the igniters when they are still functioning. While the cost of a new igniter and the manpower required to install it is not great, the early replacement does impose another cost, which can be significant.

The aircraft in which the igniter is being replaced represents a revenue source measured in thousands of dollars per hour. If the aircraft is rendered non-functional for, say, two hours during replacement of an igniter, the revenue lost during that time is substantial.

Therefore, the uncertain lifetimes of igniters in gas turbine aircraft engines can impose significant losses in revenue.

SUMMARY OF THE INVENTION

Normal operation of an igniter in a gas turbine engine causes erosion of an insulator inside the igniter. In one form of the invention, an auxiliary ground electrode is embedded within that insulator, and the erosion eventually exposes the auxiliary electrode. The igniter is designed so that the exposure occurs at the time when the igniter should be replaced.

The exposed auxiliary ground electrode can be detected by the fact that, when a spark occurs, a small current travels through the auxiliary ground electrode. When that current is detected, its presence indicates the exposure. Alternately, the exposed auxiliary ground electrode can be visually detected by a human observer, perhaps by using a borescope.

DETAILED DESCRIPTION OF THE INVENTION

Figure 2:
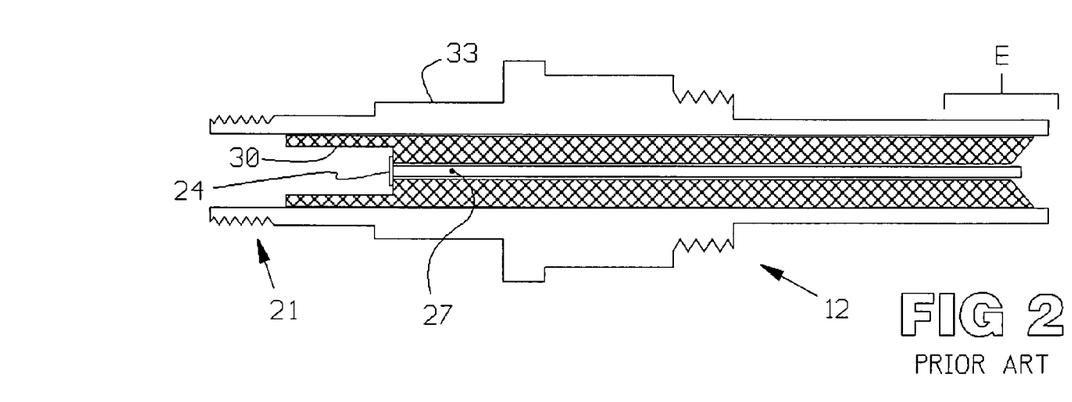
FIG. 2 illustrates an igniter 12, shown in FIG. 1.

FIG. 2 illustrates an igniter 12 used in the prior art. An electrical connector (not shown) is threaded onto threads 21, and contains an electrical contact (not shown) which mates with the end 24 of electrode 27. Insulator 30 isolates electrode 27 from the shell 33 of the igniter 12.

Figure 3:
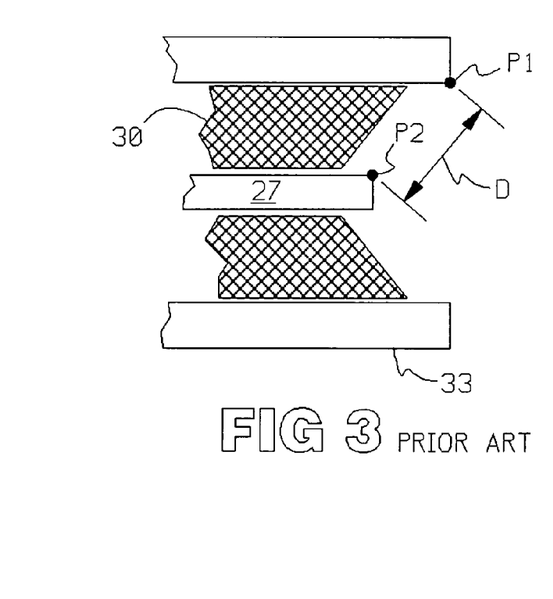
FIGS. 3 and 4 are enlarged views of end E in FIG. 2.
Figure 4:
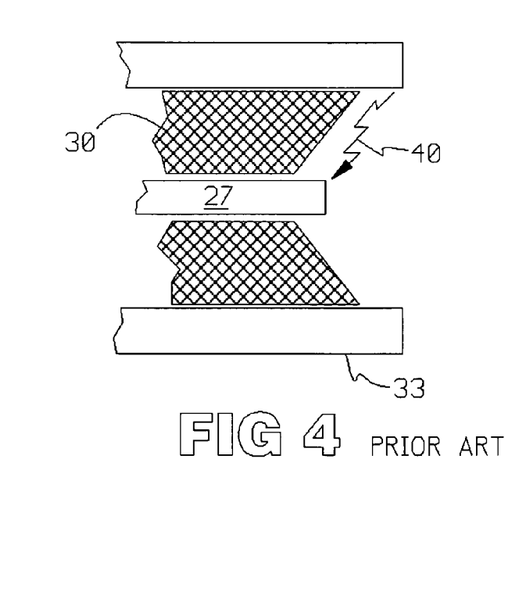

End E of the igniter 12 is shown in FIGS. 3 and 4. A very simplified explanation of the physics involved in plasma generation will be given.

In operation, a high voltage is applied to the electrode 27, thereby creating a voltage difference, or potential difference, V between points P1 and P2 in FIG. 3. The electric field in that region equals the potential difference V divided by the distance D between the points P1 and P2. For example, if the voltage is 20,000 volts and the distance D is 10 millimeters, or 0.01 meter, then the electric field equals 20,000/0.01, or 2 million volts per meter.

The electric field is designed to exceed the dielectric breakdown strength of the material, or medium, lying between points P1 and P2. That material is a mixture of air plus fuel. However, the field does not exceed the breakdown strength of insulator 30, and that strength exceeds that of the air-fuel mixture.

When breakdown occurs, the electric field strips electrons away from the atoms in the medium, producing positively charged ions and free electrons. The electric field drives the free electrons in a direction parallel with the electric field. However, during that movement, those temporarily free electrons will collide with other ions. Also, thermal motion of the ions and electrons will also bring them together in collisions.

In the collisions, the electrons will be captured by the ions, and will drop to a lower energy state, releasing heat and light, in the form of an electric arc which is called a plasma, which is indicated as lightning bolt 40 in FIG. 4. This process continues as long as the electric field is present.

Figure 5:
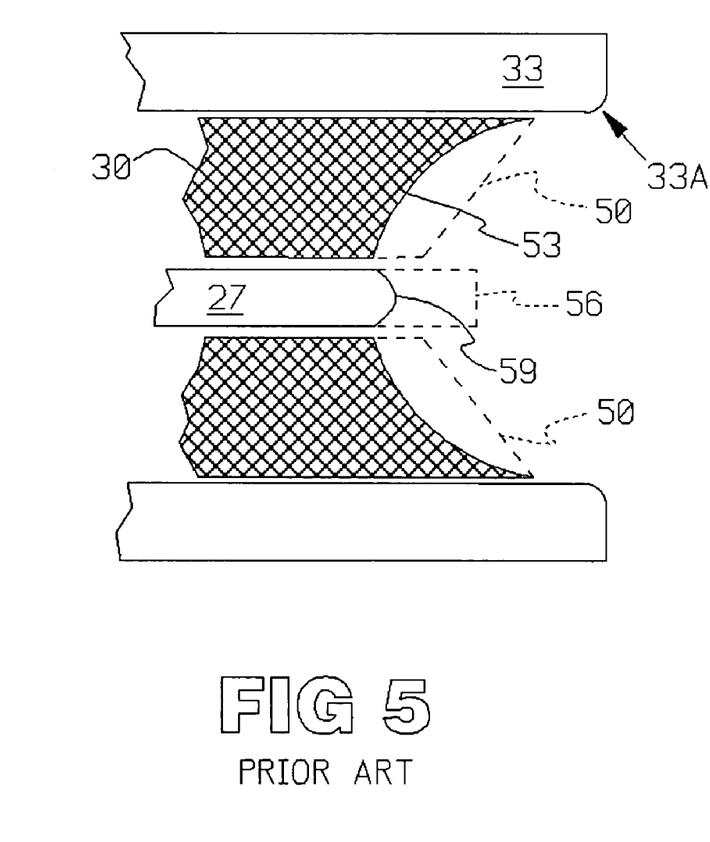
FIGS. 5 and 6 illustrate changes in geometry of end E which the Inventors have observed.

The Inventors have observed one result of the operation just described. As indicated in FIG. 5, the insulator 30 becomes eroded from the phantom shape 50 to the curved shape 53. In addition, the electrode 27 becomes eroded from the phantom shape 56 to the solid shape 59. Corners 33A also become eroded.

The Inventors believe that one or more of the following agencies are responsible for the erosion. One agency is the corrosive nature of the plasma: free electrons are very reactive, and seek to bind to any available atoms or ions which are nearby. Also, the generation of free electrons from oxygen, which is present in the air, creates ionized oxygen, which is also highly reactive.

A third agency is that the plasma creates a high-temperature environment. A high temperature, by definition, represents agitated atoms and molecules with high velocities. High-velocity atoms and molecules react more readily with stationary objects when they collide with the objects.

Possibly a fourth agency is the fact that the plasma generates high-frequency photons, in the ultra-violet, UV, and perhaps into the X-ray regions of the spectrum. It is well known that UV and X-radiation can damage numerous types of material.

Figure 6:
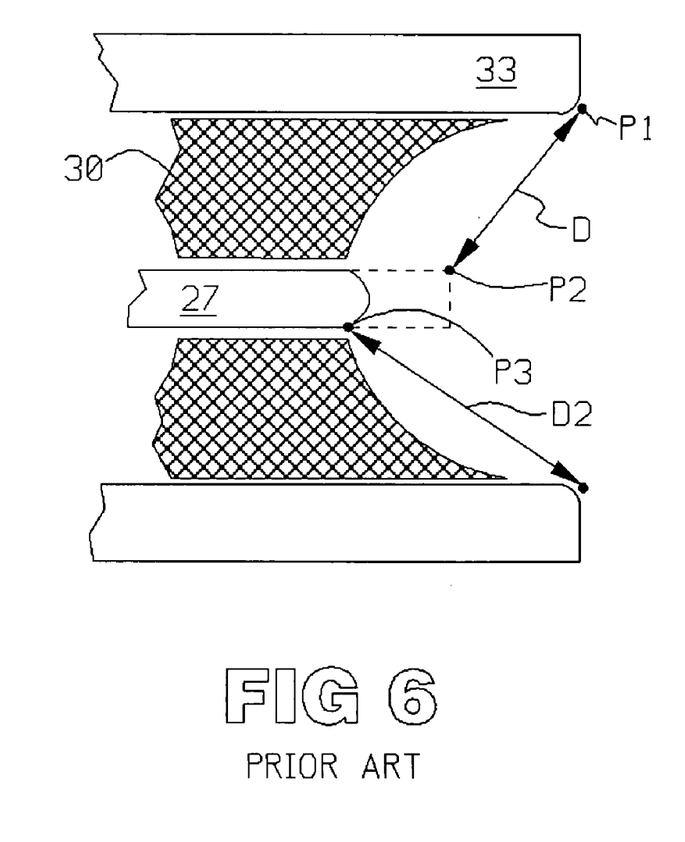

Irrespective of the precise causes of the erosion, the erosion illustrated in FIG. 5 eventually causes the igniter 12 to eventually stop functioning. A primary reason is illustrated in FIG. 6. Previously, prior to the erosion, voltage was applied between points P1 and P2 in FIG. 6. However, after the erosion, point P2 has effectively moved to point P3. Distance D has now become longer distance D2. The electric field, which causes the ionization and thus the plasma, is now weaker.

Continuing the example given above, if distance D2 is 20 millimeters, then the electric field becomes 20,000/0.020, or one million volts per meter, half its original value. Eventually, distance D2 becomes so great that the electric field does not reliably exceed the dielectric breakdown strength of the air-fuel mixture, and ionization ceases to occur.

Figure 7:
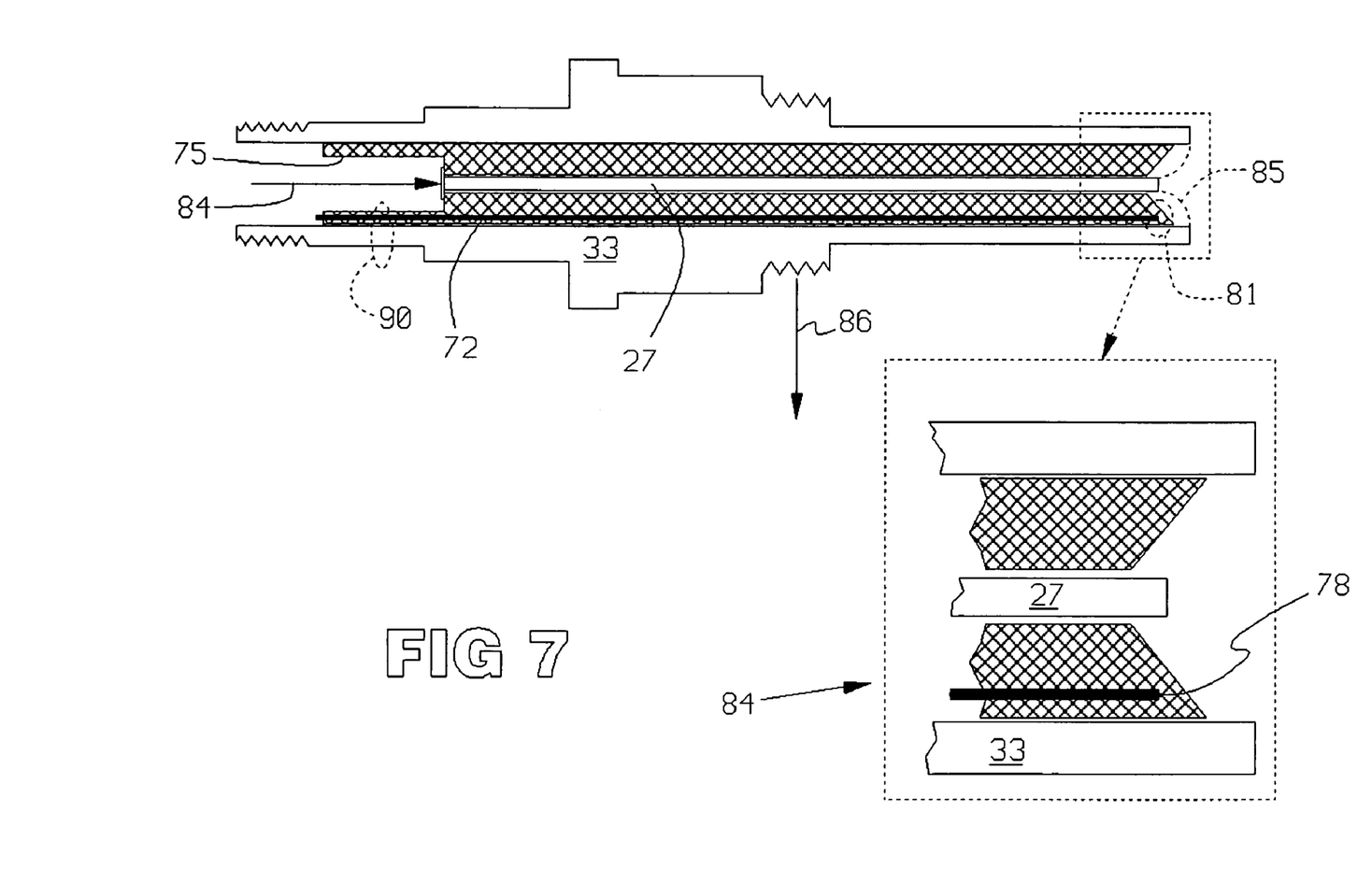
FIG. 7 illustrates one form of the invention.

FIG. 7 illustrates one form of the invention. An auxiliary electrode 72 is embedded in the insulator 75. The tip 78 is covered by the insulator-material in region 81, as indicated by the insert 84. Auxiliary electrode 72 may be connected to the shell 33, as at region 90.

Initially, current enters electrode 27 as indicated by arrow 84, jumps to the shell 33 through the plasma 85, and exits the shell 33 into the engine, through multiple paths, such as through its mounting threads, as indicated by arrow 86.

Figures 8, 9, 14:
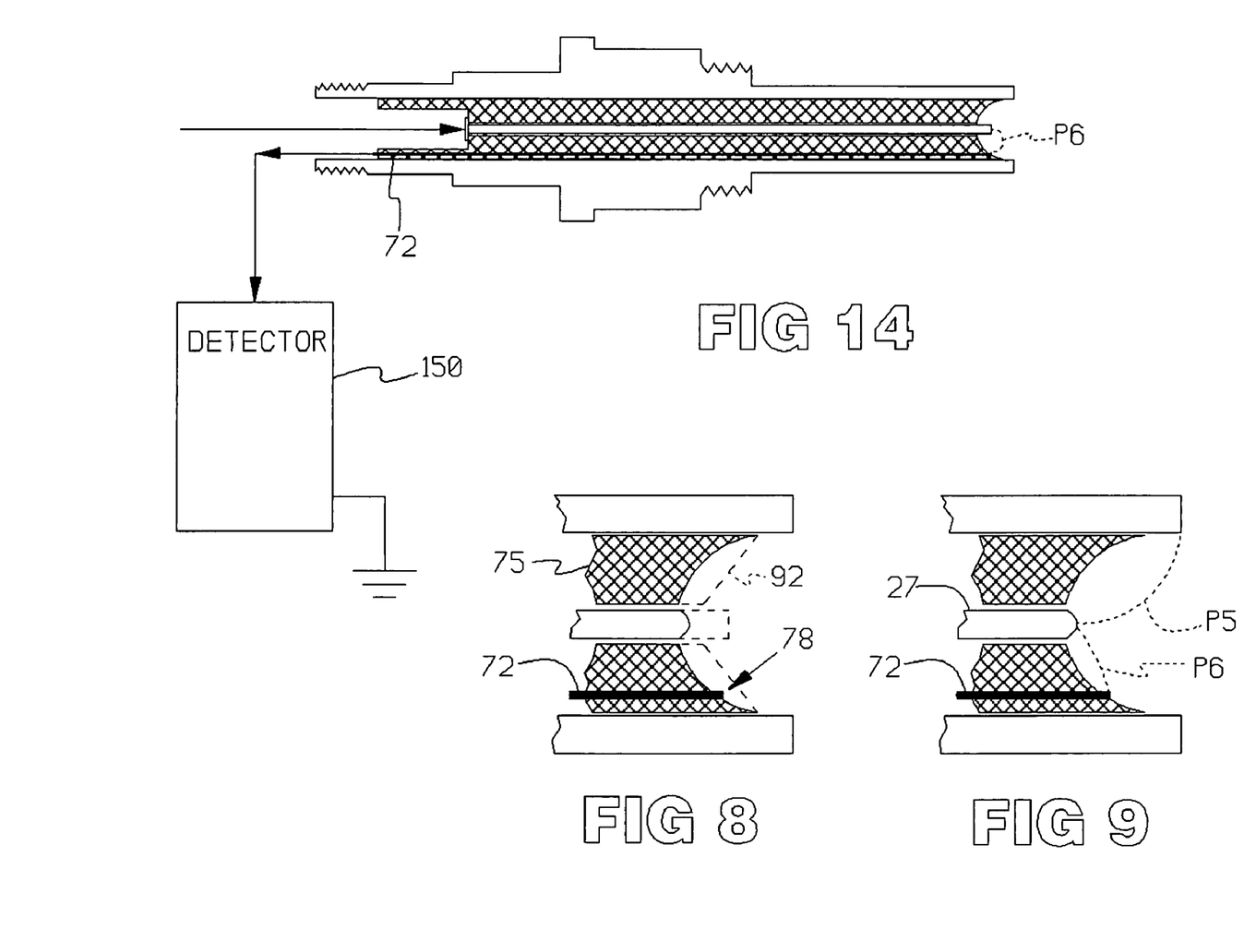
FIGS. 8 and 9 are views resembling insert 84 in FIG. 7.
FIG. 14 illustrates one form of the invention.

As erosion occurs, the insulator 75 departs from its initial shape indicated by phantom lines 92 in FIG. 8. Tip 78 of the auxiliary electrode 72 now becomes exposed. Now, when a high voltage is applied to the igniter, two paths exist for a plasma to follow. One is the usual path P5 in FIG. 9. The other path is indicated as P6 of FIG. 9, and runs from the central electrode 27 to the now-exposed auxiliary electrode 72.

Restated, two current-return-paths are available to the central electrode 72. Path P5 runs to the shell 33, in the usual manner. Path P6 runs to the now-exposed auxiliary electrode 72. Eventually, further erosion will lengthen path P5, and cause plasma formation along that path to terminate. That is, path P5 in FIG. 9 initially can be represented by distance D in FIG. 6. After sufficient erosion, path P5 in FIG. 9 will be represented by distance D2 in FIG. 6, and, as explained above, no plasma will be generated along path P5 when distance D2 becomes sufficiently large.

However, auxiliary plasma path P6 is still available in FIG. 9 at this time. A plasma can still be generated, and the lifetime of the igniter has been increased.

Figure 10:
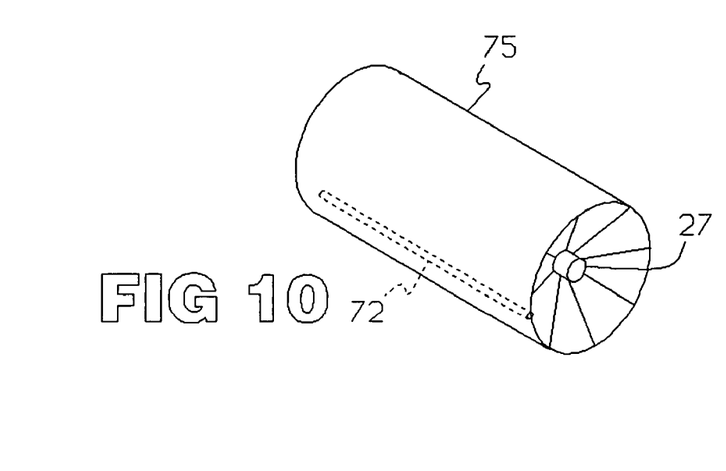
FIG. 10 is a perspective view of part of FIG. 7.

The preceding discussion presented the auxiliary electrode 72 in FIG. 7 in the form of a rod. FIG. 10 illustrates such a rod in perspective view, surrounded by insulator 75.

Figure 11:
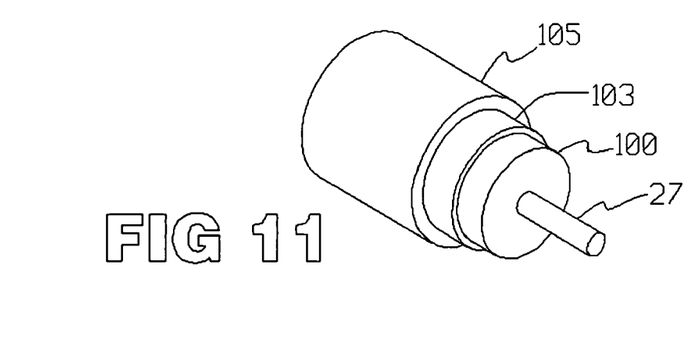
FIG. 11 is a perspective, cut-away view of one form of the invention.
Figure 12:
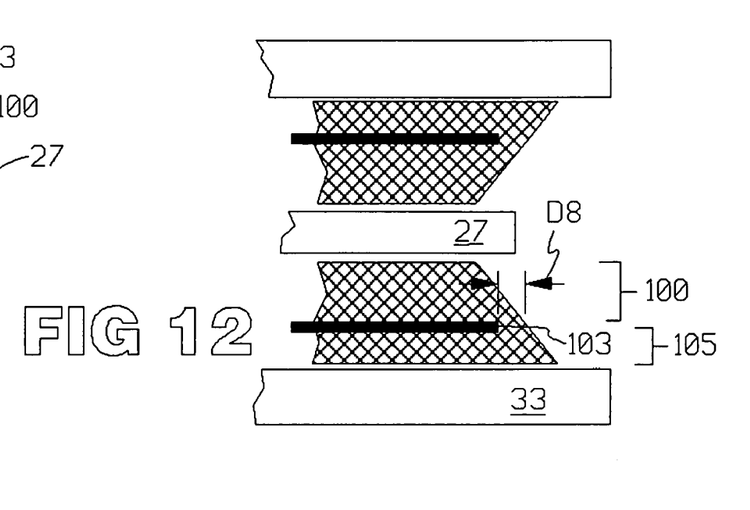
FIG. 12 is a cross-sectional view of the apparatus of FIG. 11.

In an alternate embodiment, a cylinder is used. FIG. 11 is a cut-away view of one embodiment. Central electrode 27 is surrounded by an insulator 100, which itself is surrounded by a conductive tube or cylinder 103, which is then surrounded by another layer of insulator 105. FIG. 12 illustrates the system in cross-sectional view, with similar numbering.

Figure 13:
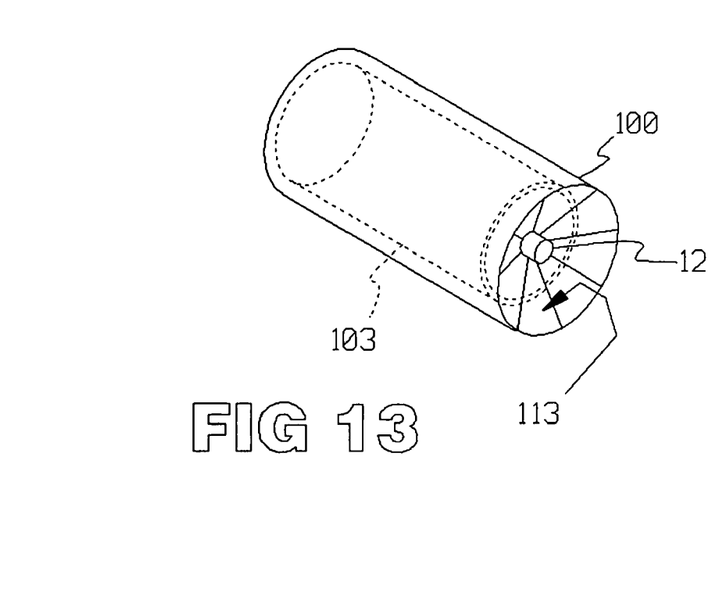
FIG. 13 is a perspective view of the apparatus of FIG. 11.

FIG. 13 illustrates the insulator 100 in its initial configuration, after manufacture or just after installation. A tip 110 of central electrode 27 is exposed, and surrounded by the conical surface 113 of the insulator 100. Cylindrical auxiliary electrode 103 is embedded within the insulator 100, and no tip or edge is exposed, as indicated by distance D8 in FIG. 12.

The preceding discussion stated that the auxiliary electrode 72 may be connected at region 90 in FIG. 7. In another embodiment, the auxiliary electrode 72 of FIG. 14 is also connected to ground, but through a detector 150. Detector 150 looks for a current in auxiliary electrode 72. Current detectors are well known.

If no current is detected, it is inferred that the auxiliary electrode 72 is still embedded within insulator 75, as in FIG. 7, and is electrically isolated from central electrode 27.

In contrast, if a current is detected, it is inferred that the auxiliary electrode has become exposed through erosion, as in FIG. 9. The detected current is attributed to a plasma following path P6. When the current is detected, detector 150 issues a signal, sets a flag, or otherwise indicates the inference that erosion has exposed auxiliary electrode. A human technician at that time, or a prescribed time afterward, replaces the igniter.

An alternate mode of detection is to remove the igniter and visually examine the end corresponding to end E in FIG. 2. If a smooth surface of the insulator 100 is seen, as in FIG. 13, then it is concluded that the igniter is still functional. However, if the auxiliary electrode 72 is seen, as in FIG. 8, then it is concluded that replacement may be required.

Figures 15, 16, 17:
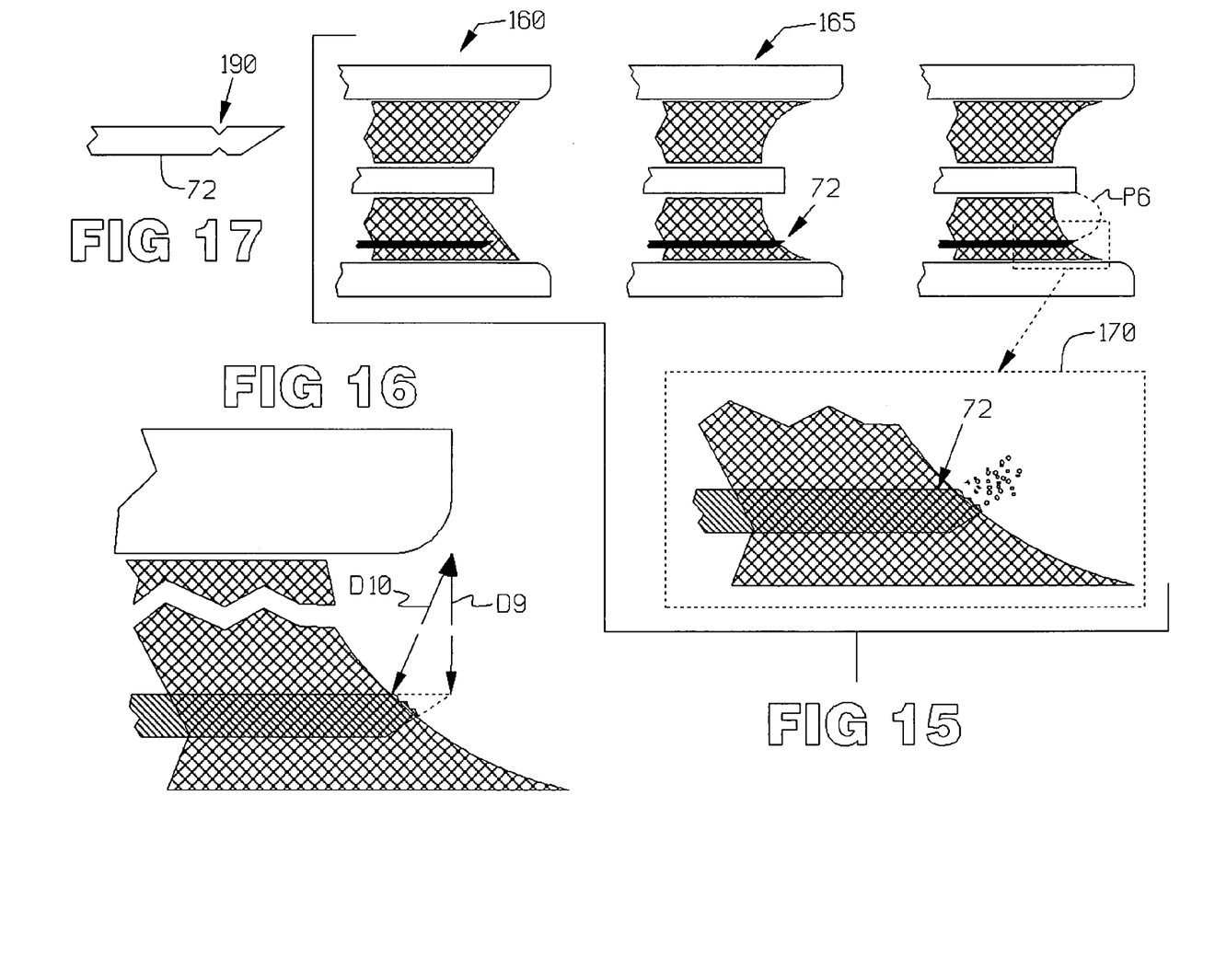
FIG. 15 illustrates a sequence of events occurring in one form of the invention.
FIG. 16 illustrates two distances D9 and D10, over which two electric fields are generated.
FIG. 17 illustrates one mode of constructing auxiliary electrode 72 in FIG. 15.

In another embodiment, the auxiliary electrode is designed to become exposed, and then to erode rapidly. FIG. 15, viewed left-to-right, illustrates first a newly installed igniter 160. After a period of usage, igniter 165 exposes its auxiliary electrode 72. Now a plasma P6 extends to the auxiliary electrode 72.

However, as stated above, the auxiliary electrode 72 is designed to erode rapidly. For example, as insert 170 indicates, the auxiliary electrode 72 is fabricated with a pointed end. Plasma 6 causes the pointed end to become rapidly eroded, as indicated by the small particles in frame 170. This operation causes a specific sequence of two events.

One is that, when the auxiliary electrode becomes first exposed, a current passes through the it. The current is detected, as by detector 150 in FIG. 14. Next, after the auxiliary electrode fractures or erodes, no current passes through it.

One reason for this sequence is illustrated in FIG. 16. Initially, the voltage V spans distance D9, creating an electric field equal to V/D9. After fracture or erosion, the same voltage V spans distance D10. The electric field equals V/D10, a smaller value. The latter electric field is insufficient to create a plasma, while the former is.

In one embodiment, the occurrence of the two events just described occurs prior to the termination of the lifetime of the igniter. Thus, that termination is signalled by the occurrence of a current through the auxiliary electrode 72, followed by a termination of that current. The onset of the current indicates the approach of the termination of the lifetime, but with time remaining to operate the engine. The subsequent termination of the current indicates that less time remains, and that replacement of the igniter becomes more important.

FIG. 17 illustrates one embodiment of the auxiliary electrode 72. A neck, or groove, 190 is provided, which facilitates the breakage schematically illustrated in the insert 170 in FIG. 15. The groove 190 is a region of mechanical weakness intentionally built into the auxiliary electrode 72. Prior to the erosion indicated in FIG. 8, that weakness is not important, because mechanical support to the electrode is supplied by the insulator 75.

The discussion above stated that a high voltage is applied to electrode 27. It is possible that a low voltage applied to the electrode 27 can accomplish the same function of generating a plasma.

Numerous substitutions and modifications can be undertaken without departing from the true spirit and scope of the invention. What is desired to be secured by Letters Patent is the invention as defined in the following claims.

The invention claimed is:

1. Method of operating a fuel igniter in an engine, comprising:
   a) generating a first plasma near a first end of a first electrode;
   b) maintaining a second electrode having a second end;
   c) initially surrounding the second end with a solid insulation; and
   d) eroding the solid insulation, to expose the second end, and then generating a second plasma between the first and second electrodes.

2. Method according to claim 1, wherein the first plasma is a cause of eroding the solid insulation.

3. Method according to claim 1, wherein the first plasma is generated within a medium and the solid insulation has a higher breakdown strength than the medium.

4. Method according to claim 1, wherein a current in the second electrode accompanies the second plasma, and further comprising:
   e) detecting the current and issuing a signal in response.

5. Method according to claim 1, wherein the engine comprises a gas turbine.

6. Method of operating a fuel igniter in an engine, comprising:
   a) generating a first plasma near a first end of a first electrode;
   b) maintaining a second electrode having a second end;
   c) initially surrounding the second end with a solid insulation; and
   d) eroding the solid insulation, to expose the second end, and then generating a second plasma between the first and second electrodes, wherein a current in the second electrode accompanies the second plasma;
   e) detecting the current and issuing a signal in response.
   f) replacing the fuel igniter with a different fuel igniter in response to the signal.

7. Method according to claim 6, and further comprising:
   g) in the different fuel igniter,
      i) generating a first plasma near a first end of a first electrode;
      ii) maintaining a second electrode having a second end;
      iii) initially maintaining a solid insulation completely surrounding the second end; and
      iv) eroding the solid insulation, to expose the second end, and then generating a second plasma between the first and second electrodes.

8. Method according to claim 7, wherein the engine comprises a gas turbine.

9. An igniter for a gas turbine engine, comprising:
   a) a first electrode having a tip;
   b) a second electrode which cooperates with the tip to generate a plasma; and
   c) a third electrode having no exposure to the tip when the igniter is newly installed, but which develops exposure to the tip after a period of operation and generates a plasma between the first and third electrodes.

10. Igniter according to claim 9, and further comprising:
    d) an insulator surrounding the first electrode.

11. Igniter according to claim 10, wherein the second electrode surrounds the insulator.

12. Igniter according to claim 11, wherein the third electrode is insulated from both the first and second electrodes.

13. Igniter according to claim 9, and further comprising a sensor connected to the third electrode, for detecting current in the third electrode.

14. An igniter for a gas turbine engine, comprising:
    a) a first electrode, rod-like in configuration, coaxial with an axis;
    b) an insulator surrounding the first electrode, except at a tip of the first electrode, where said tip is exposed;

c) a second electrode, generally cylindrical in configuration, coaxial with said axis, and surrounding the insulator and the first electrode;

d) a third electrode having a distal end, embedded in the insulator and completely surrounded by the insulator; wherein operation of the igniter causes part of the insulator to erode, thereby causing part of the third electrode to become exposed to the tip and cooperate with the tip to from a plasma.

15. An igniter for a gas turbine engine, comprising:
a) a first electrode having a tip;
b) an insulator surrounding the first electrode;
c) a second electrode surrounding the insulator, and having an edge which cooperates with the tip to generate a plasma; and
d) a third electrode embedded in the insulator, having no part exposed to the first electrode; wherein operation of the igniter causes part of the insulator to erode, thereby causing part of the third electrode to become exposed to the tip and cooperate with the tip to form a plasma.

16. Igniter according to claim 15, and further comprising a sensor connected to the third electrode, for detecting current in the third electrode.

17. Igniter according to claim 15, wherein the third electrode comprises a cylinder, and surrounds the first electrode.

18. An igniter for a gas turbine engine, comprising:
a) a first electrode;
b) a second electrode which cooperates with the first electrode to generate a plasma;
c) a third electrode;
d) a barrier between the third electrode and the first electrode which
 i) blocks auxiliary plasma formation between the first and third electrodes at a time T1, and
 ii) erodes after T1, to enable said auxiliary plasma formation.

19. An igniter for a gas turbine engine, comprising:
a) first and second electrodes which
 i) cooperate to generate a plasma; and
 ii) wherein plasma generation is accompanied by a change which inhibits later plasma generation; and
b) a third electrode which
 i) becomes available with said change; and
 ii) cooperates with either the first or second electrode to generate a plasma.

20. An igniter for a gas turbine engine, comprising:
a) a first electrode;
b) a second electrode which cooperates with the first electrode to generate a plasma; and
c) a third electrode which
 i) is separated from the first electrode by an erodible shield; and
 ii) cooperates with the first electrode to generate a plasma when sufficient erosion of the shield occurs.

21. Igniter according to claim 20, wherein both the second and third electrodes cooperate with the first electrode to generate a plasma after predetermined erosion occurs.

* * * * *